D. A. CLARK AND C. E. LOWE.
TIRE CORE.
APPLICATION FILED JULY 31, 1919.
1,330,784.
Patented Feb. 17, 1920.
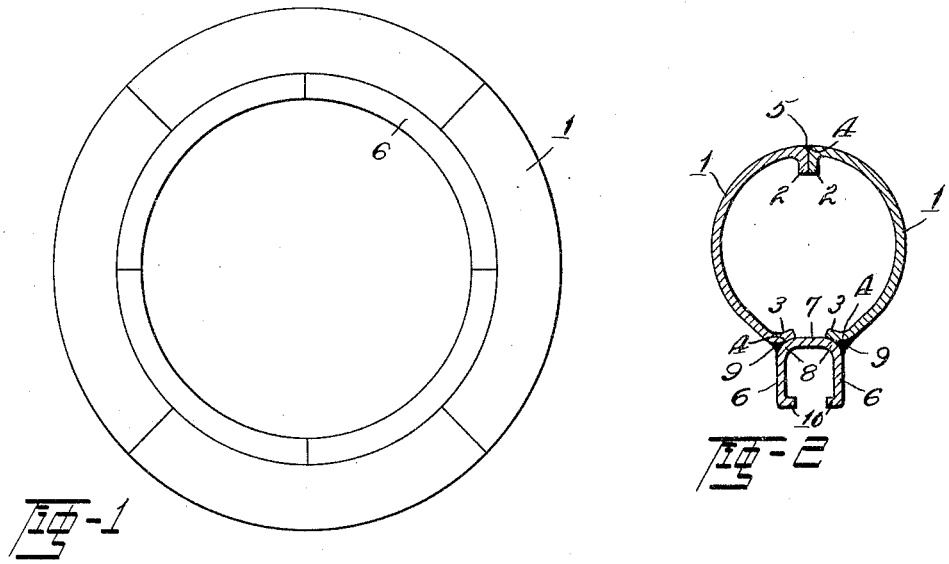
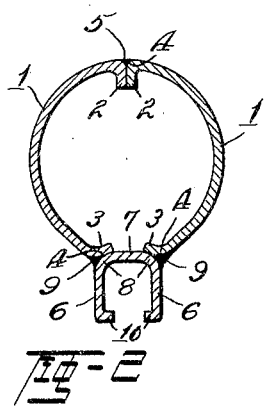
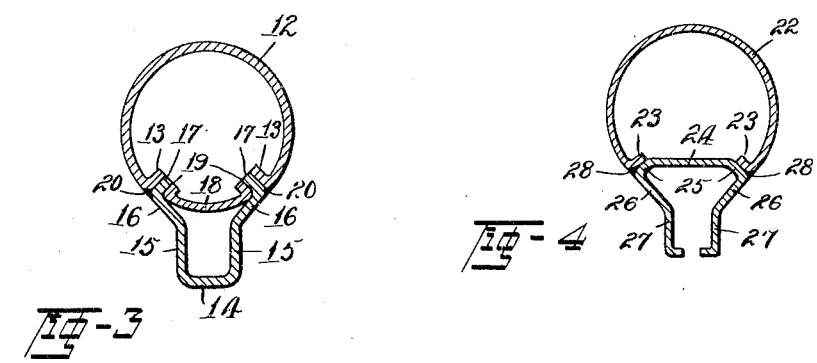
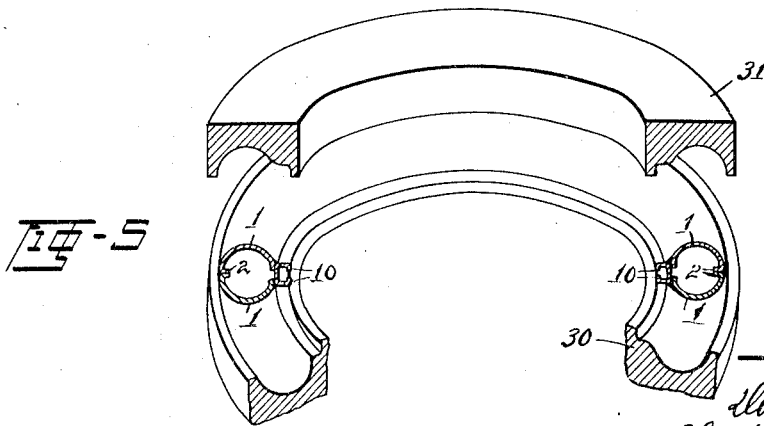
Inventors
Don A Clark and
Clyde E. Lowe
By Hull Smith Brock & West
Attys.

UNITED STATES PATENT OFFICE.

DON A. CLARK AND CLYDE E. LOWE, OF CLEVELAND, OHIO, ASSIGNORS, BY MESNE ASSIGNMENTS, TO THE REPUBLIC TOOL AND MANUFACTURING COMPANY, OF CLEVELAND, OHIO, A CORPORATION OF DELAWARE.

TIRE-CORE.

1,330,784.   Specification of Letters Patent.   Patented Feb. 17, 1920.

Application filed July 31, 1919. Serial No. 314,549.

*To all whom it may concern:*

Be it known that we, DON A. CLARK and CLYDE E. LOWE, citizens of the United States, residing at Cleveland, in the county of Cuyahoga and State of Ohio, have invented a certain new and useful Improvement in Tire-Cores, of which the following is a full, clear, and exact description, reference being had to the accompanying drawings.

This invention relates to mandrels for use in the production of pneumatic tires and parts thereof under which term we include not only the specific mandrels used for the fashioning of inner tubes but also the cores used in making casings and liners. In certain former applications which we have filed we described and claimed various constructions of mandrel or core and various means for fashioning the same out of sheet metal. For example in our patent granted July 16, 1918, No. 1,273,032, we described a key-hole core made by stretching the sheet metal thereon over a mandrel of the proper shape so as to place the same under tension, and in our application filed June 26, 1918, Serial No. 242,019, we described and claimed the process of making such core. In our application filed January 22, 1919, Serial No. 272,412, we described and claimed the process of making a mandrel by compression after welding so as to impart thereto the requisite size, shape and rigidity, and in our application filed March 7, 1919, Serial No. 281,283, Patent No. 1,316,276 we described and claimed a sheet metal mandrel for reliners and inner tubes having the shape and structure required by such compression process though not limited thereto.

The object of the present invention is the provision of a key-hole core whose parts are so arranged as to permit the same to be made by the compression process as generally described and set forth in our above mentioned application, Serial No. 272,412, and this application is intended to cover certain of the new articles of manufacture first described in that application. It has long been the established practice to fashion the casings of pneumatic tires upon cores having the general shape of a torus whose cross section is of substantially key-hole shape. In order to obtain the necessary accuracy of shape and size as well as the smooth and finished surface requisite to successful operation, these devices were for a long time made of cast iron and turned to size in a boring mill, which is not only a very expensive operation but results in a heavy and unwieldy core of unduly high heat capacity. The requirements of accuracy, however, for a long time could be fulfilled in no other way, but the present invention contemplates a core made of sheet metal whereby the cost is greatly reduced, the weight decreased, the production facilitated, the heat capacity lessened, and the requisite accuracy or size and shape secured, coupled with great resistance to distortion.

In the drawings accompanying and forming a part of this application we have shown our invention as embodied in certain physical forms, along with one step of our improved process, although it will be understood that these drawings are illustrative merely and are not intended to limit us solely to those construction or steps. In these drawings Figure 1 is a side view of a completed core; Figs. 2, 3 and 4 are sectional views drawn to enlarged scale of three different constructions of such core; and Fig. 5 illustrates the mode of compressing the article to its finished shape.

The devices shown herein are constructed essentially in accordance with the processes set forth and claimed in our said application Serial No. 272,412, that is to say: suitable pieces of sheet metal are first drawn between dies to the appropriate channel form, then welded together to form a substantially torus-shaped hollow body having the internal rectangular flange characteristic of this type of core, and the device compressed to the exact shape and size by striking between finished dies as shown in Fig. 5, whereby the metal of the entire core is forcibly compressed to its final shape under this single blow and the various strains due to welding and other operations are overcome. In order that the compressing action desired may not be frustrated by crumpling or elastic yielding of the metal it is necessary that the body of the device be everywhere convex and without reëntrant angles, and we secure this end by bridging the base of the rectangular flange by means of a continuous web; or, from another point of view the finished core may be looked upon as comprising nearly an exact torus having an internal rectangular flange as an added member, although this flange may be integral with a part of the torus. This end may be achieved by any one of numerous detail constructions of which three have been shown herein as examples, although many others could be selected and our claims are not restricted to the devices here delineated.

In Fig. 2, we have shown what we will here denominate the preferred structure. The body of the torus consists of a pair of similar sheet metal blanks 1—1, each subtending less than 180° transversely and formed at both margins with inturned lips 2—2 and 3—3. The inward bending of these margins serves to produce a sloping surface 4—4 at the exterior of the blank opposite the bend. The two blanks are assembled together with the lips 2—2 in contact and connected permanently together by a weld seam 5 at this point, the sloping of the metal producing a groove for the reception of this metal and the flanges producing a local reinforcement as set forth in our application Serial No. 281,281, filed March 7, 1919. The angle subtended by the blanks 1—1 in longitudinal direction may be either greater or less as desired but we have here shown the complete core as formed of four sections each subtending 90°. The lips 3—3 are spaced apart and the gap is filled by applying thereto a separate flange member which is likewise of arcuate channel-shape having flat side walls 6—6, which constitute the sides of the core-flange, and a longitudinally-curved, transversely-flat base 7 which bridges the gap between the lips 3—3. Between each of the sides 6 and the base 7 there is an exterior sloping portion 8 corresponding to the portion 6 and coöperating therewith to produce at each side of the article a deep groove for the reception of weld-metal 9 whereby the parts of the core are permanently and rigidly held together. The longitudinal extent of this flange member can be small or great as desired but we have here shown the complete device as comprising four such members each subtending 90° and breaking joints with the blanks 1—1, thus forming a very strong and rigid device. The inner edges of the walls 6—6 we have shown as turned inwardly to form the lips 10—10, likewise for the sake of greater strength but this is entirely a matter of choice. The location of the weld seams 9—9 at the particular point shown is of great advantage to the life of the core, since in the making of tires it is customary to trim the edges of the fabrics with a knife firmly applied at this point while the core is rotated. As a result the core rapidly becomes abraded at this point, and thin metal has in some instances been cut entirely through. The weld metal in addition to holding the parts together provides a local re-inforcement to resist this action.

In the embodiment shown in Fig. 3, the body of the core is made from a single blank 12 formed at its longitudinal edges with the inturned lips 13—13; it will be understood of course that it is equally within our invention to form the same with a peripheral external seam as shown in Fig. 2 hereof. The flange portion in this embodiment consists of a channel-member having a longitudinally curved base portion 14 and two outwardly projecting flat parallel side walls 15—15 which merge with the flaring portions 16—16, the latter terminating in inturned lips 17—17 which engage the lips 13—13. Between the lips 17—17 there is interposed a bridge member 18 to complete the circle of the torus. It will be understood that the member 18 is first applied to the flange-member and welded into place at 19—19, after which the portion 12 is applied thereto and welded at 20—20.

In the embodiment shown at Fig. 4, the body portion of the core is shown as consisting of the member 22 constructed much like the member 12 in Fig. 3, and having inturned lips 23—23 at its longitudinal margins. Bridging the gap between these lips is a transversely flat web 24 whose margins are first bent outwardly as at 25—25 parallel with the lips 23, then bent farther in the same direction to form the side-walls 26—26 which form continuations of the core-exterior, and finally bent again to produce the flat, parallel, flange-walls 27—27. The blanks are secured together by longitudinal weld seams 28—28.

In all of these embodiments, and in the numberless other embodiments which can be made, it is immaterial to the present invention whether the blanks be first welded together upon their transverse margins or upon their longitudinal margins. The result of either alternative is a complete circular body, one portion of which is everywhere convex in transverse cross section and the other, or flange portion is rigidly carried thereby. The device is now laid in one-half 30 of a finishing die whose transverse size is very slightly less than that of the welded device, and the other similar half 31 of the die is applied thereto and forced downwardly with very great pressure as in a hydraulic or other powerful press, the force employed being greater than the elastic limit of the metal. As a result the welding strains are overcome and the metal is given a permanent set while the body of the core is brought to the requisite degree of accuracy. Naturally the flange portion also partakes to a considerable degree of this accuracy but slight irregularities here are not important because of the fact that the flange merely serves the purpose of providing a support for the body portion and of defining a limit for the casing walls.

Having thus described our invention what we claim is:—

1. A core for pneumatic tire manufacture made from a plurality of arcuate hollow sheet metal sections welded together, the body portion of the core being of approximate torus shape and being everywhere convex in transverse section, and the flange portion being carried thereby and completely bridged by such body portion.

2. A core for pneumatic tire manufacture made from a plurality of arcuate hollow sheet metal sections welded together, and comprising a complete torus-shaped body portion and a flange portion integrally connected therewith, said body portion being continuous across the base of said flange portion.

3. A core for pneumatic tire manufacture consisting of a torus-shaped, sheet-metal body-portion having an inwardly projecting, substantially flat-sided, hollow, sheet-metal flange, rigidly attached thereto, there being a transverse sheet-metal web bridging the interior of said flange and connecting the sides of said body-portion.

4. A core for pneumatic tire manufacture consisting of a torus-shaped, sheet-metal body-portion having an inwardly projecting, substantially flat-sided, hollow, sheet-metal flange, rigidly attached thereto, said flange consisting of a sheet-metal channel-member whose base portion is interposed between the sides of said body portion to constitute a bridging web.

5. A core for pneumatic tire manufacture comprising a hollow circular sheet metal body having transversely spaced lips at its portion of smallest diameter, and a channel-shaped flange member interposed between and welded to said lips, there being a sheet metal web constituting a bridge between said lips from one side of the core to the other, and said flange member having spaced flat walls.

6. A core for pneumatic tire manufacture comprising a hollow circular sheet metal body having transversely spaced lips at its portion of smallest diameter, and a channel-shaped flange member interposed between and welded to said lips, the base of such channel extending from one lip to the other transversely of the core to constitute a stiffening bridge, and the sides of said channel being flat and spaced apart.

7. A core for pneumatic tire manufacture comprising a hollow circular sheet metal body portion and a flat sided flange portion projecting inwardly therefrom and welded thereto, there being an external weld seam at the junction of the rounded and flat portions.

8. A core for pneumatic tire manufacture comprising a hollow circular sheet metal body having transversely spaced inturned lips at its portion of smallest diameter, and a channel shaped flange member having a portion embraced between said lips, the exterior of said last member being sloped at the region adjacent to said lips so as to form therewith a groove for the reception of weld metal, and another portion of said flange member having spaced, parallel, inwardly-projecting walls, and weld metal in said groove securing the parts together.

In testimony whereof, we hereunto affix our signatures.

DON A. CLARK.
CLYDE E. LOWE.